United States Patent [19]

Ianni et al.

[11] Patent Number: 5,185,883
[45] Date of Patent: Feb. 9, 1993

[54] SYSTEM FOR LOCATING FAILURE SIGNALS BY COMPARING INPUT DATA WITH STORED THRESHOLD VALUE AND STORING FAILURE ADDRESSES IN ALTERNATING BUFFERS

[75] Inventors: Suzanne G. Ianni, Natick; John R. Fierke, Southboro, both of Mass.; Stephen A. Connors, Center Barnstead, N.H.

[73] Assignee: Data Translation, Inc., Marlboro, Mass.

[21] Appl. No.: 603,791

[22] Filed: Oct. 26, 1990

[51] Int. Cl.⁵ .................. G06F 15/64; G06F 3/05; G06F 7/00
[52] U.S. Cl. .................. 395/575; 358/209; 371/21.2; 382/8; 364/920; 364/920.8; 364/DIG. 2
[58] Field of Search .............. 395/800, 575; 382/8, 382/18; 371/21.2; 358/209

[56] References Cited

U.S. PATENT DOCUMENTS

| | | | |
|---|---|---|---|
| 3,940,601 | 2/1976 | Henry et al. | 371/24 |
| 4,137,562 | 1/1979 | Boeck et al. | 395/425 |
| 4,559,626 | 12/1985 | Brown | 371/21.2 |
| 4,606,065 | 8/1986 | Beg et al. | 382/18 |
| 4,656,507 | 4/1987 | Greaves et al. | 358/96 |
| 4,672,190 | 6/1987 | Rostkowski et al. | 250/202 |
| 4,872,053 | 10/1989 | Gay | 340/825.65 |
| 4,924,416 | 5/1990 | Sasao | 340/825.06 |
| 4,991,223 | 2/1991 | Bradley | 382/17 |
| 5,001,418 | 3/1991 | Posse et al. | 324/73.1 |
| 5,033,105 | 7/1991 | Atkinson | 382/56 |
| 5,038,369 | 8/1991 | Nishiki | 378/62 |
| 5,047,771 | 9/1991 | Engler et al. | 341/140 |
| 5,047,861 | 9/1991 | Houchin et al. | 358/213.15 |
| 5,077,806 | 12/1991 | Peters et al. | 382/8 |
| 5,085,325 | 2/1992 | Jones et al. | 209/580 |
| 5,095,204 | 3/1992 | Novini | 250/223 |
| 5,123,016 | 7/1992 | Müller et al. | 371/10.3 |

OTHER PUBLICATIONS

Numevision Product Literature, "Line Scan Subsystems for Automated Inspection".
Imaging Technology, Inc. "Images", Winter 1989.

Primary Examiner—Thomas C. Lee
Assistant Examiner—Meng-Ai T. An
Attorney, Agent, or Firm—Fish & Richardson

[57] ABSTRACT

A data acquisition circuit for receiving an analog input signal having a magnitude representing light intensity detected by a sequentially accessed, linear array of photocells of a line scan camera and providing digital data signals for use by a computer, the circuit including an analog-to-digital converter to convert said analog input signal to a stream of digital intensity signals, an offset memory storing offset correction values for respective photocells, a gain memory storing gain correction values for respective photocells, an adder connected to add or subtract the digital intensity signal for a given photocell to the offset correction value for that photocell and provide an offset-corrected digital signal, a multiplier connected to multiply the offset-corrected digital signal for a given photocell times the gain correction value for that photocell to provide a calibrated digital signal. Also disclosed are: comparing, on a photocell-by-photocell (i.e., pixel-by-pixel) basis, the value of the digital intensity signal for each photocell with a respective threshold value stored in a threshold memory; a processing circuit that determines when the intensity values for adjacent photocells in the linear array in the line scan camera have a change in value and stores identification of the photocell at which there was a change in value; and a data compressor that receives parallel multibit intensity signals and provides single bit signals based on the values of the parallel multibit signals and a serial-to-parallel converter that sequentially stores the single multibit signals and groups a plurality of them together into a compressed, parallel multibit signal.

6 Claims, 2 Drawing Sheets

SYSTEM FOR LOCATING FAILURE SIGNALS BY COMPARING INPUT DATA WITH STORED THRESHOLD VALUE AND STORING FAILURE ADDRESSES IN ALTERNATING BUFFERS

BACKGROUND OF THE INVENTION

The invention relates to a data acquisition circuit that receives the analog output of a line scan camera and provides it in a digital form for use by a computer.

Line scan cameras are used to scan scenes in a one-dimensional manner, one line of pixels at a time. They are often used to check the size or shape of objects traveling on a conveyor belt. They typically employ a linear array of photocells, each photocell providing a pixel of the line. The photocells are triggered simultaneously to detect light intensity at the same time, and the individual outputs of the photocells are accessed in a sequential manner, starting at one side of the linear array and going to the other. The output of the line scan camera is an analog signal having a magnitude related to intensity.

The analog output of the line scan camera is converted into digital form by an analog-to-digital converter. A timing signal from the line scan camera is used to correlate the value of the analog output at a given time with a particular photocell of the array, so that a series of digital outputs is obtained, each output representing the intensity detected at a particular photocell. The digital outputs can then be temporarily stored for use by a computer.

SUMMARY OF THE INVENTION

In one aspect, the invention features in general a data acquisition circuit for a line scan camera that includes offset and gain memories for storing offset and gain correction values for each photocell of the line scan camera, an adder that adds (or subtracts) offset correction values from a digital intensity signal for a given photocell to provide an offset-corrected digital signal, and a multiplier that multiplies a gain correction value for a given photocell times the offset-corrected digital signal for that photocell. In this manner, the individual photocells are accurately calibrated for individual variations in offset and gain.

In another aspect, the invention features in general a data acquisition circuit for a line scan camera that compares, on a photocell-by-photocell (i.e., pixel-by-pixel) basis, the value of the digital intensity signal for each photocell with a respective threshold value stored in a threshold memory.

In preferred embodiments, the threshold memory stores both minimum and maximum threshold values, and failures are recorded for digital intensity values falling below the minimum threshold and for digital intensity values falling above the maximum threshold. A failure counter is used to provide a count of the number of failures. The address of each out-of-range intensity value and the failure condition (too high or too low) are stored in a buffer. There are two buffers so that one line of intensity values can be written into one buffer while the preceding line of values is read out of the other buffer.

In another aspect, the invention features in general a data acquisition circuit for a line scan camera that includes a processing circuit that determines when the intensity values for adjacent photocells in the linear array in the line scan camera have a change in value and stores identification of the photocell at which there was a change in value.

In preferred embodiments, the intensity value is stored each time there is a change in value. The photocell identification that is stored can be an absolute address identifying the photocell at which there is a change in value or a relative address that indicates the number of photocells between photocells at which there were changes in value. A look-up table is used to convert the digital intensity signals prior to comparison. The values read from the look-up table have fewer bits than the digital intensity signals used to address the look-up table.

In another aspect, the invention features in general a data acquisition circuit for a line scan camera that includes a data compressor and serial-to-parallel converter. The data compressor receives parallel multibit intensity signals and provides single bit signals based on the values of the parallel multibit signals. The serial-to-parallel converter sequentially stores the single multibit signals and groups a plurality of them together into a compressed, parallel multibit signal. By performing this compression and serial-to-parallel conversion, a plurality of pixels can be read in a single system read operation, greatly reducing the amount of time required to transfer pixel data to a computer.

Other advantages and features of the invention will be apparent from the following description of the preferred embodiment thereof and from the claims.

DRAWINGS

STRUCTURE

Figure 1:
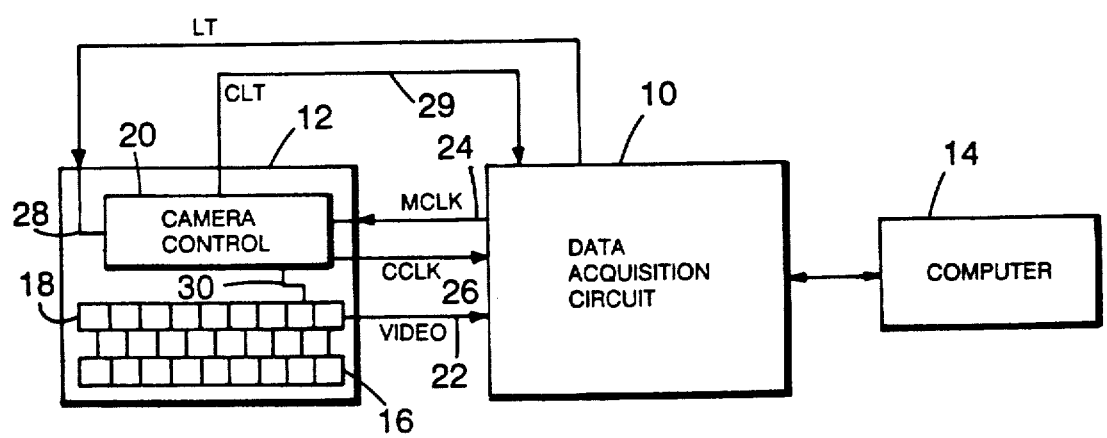
FIG. 1 is a block diagram showing a data acquisition circuit according to the invention connected to a line scan camera and a computer.

Referring to FIG. 1, there is shown data acquisition circuit 10 connected to receive an analog output signal from line scan camera 12 and to provide the camera output in digital form to computer 14 (e.g., an IBM Personal Computer). Line scan camera 12 includes a linear array of photocells 16, analog shift register 18, and camera control circuit 20. Photocells 16 are, for example, charge coupled devices. Analog shift register 18 provides a video output on line 22. Camera control circuit 20 receives a master clock signal (MCLK) on line 24 from data acquisition circuit 10 and provides camera clock signal (CCLK) on line 26 to data acquisition circuit 10. Camera control circuit 20 receives a line transfer signal (LT) from data acquisition circuit 10 on line 28 to simultaneously expose all photocells 16, and provides read signals over line 30 to analog shift register 18 to sequentially access the stored analog pixel (i.e., photocell intensity) values in register 18 in synchronism with pulses of CCLK on line 26. It also provides camera line transfer signal (CLT) on line 29 to data acquisition circuit 10.

Figure 2:
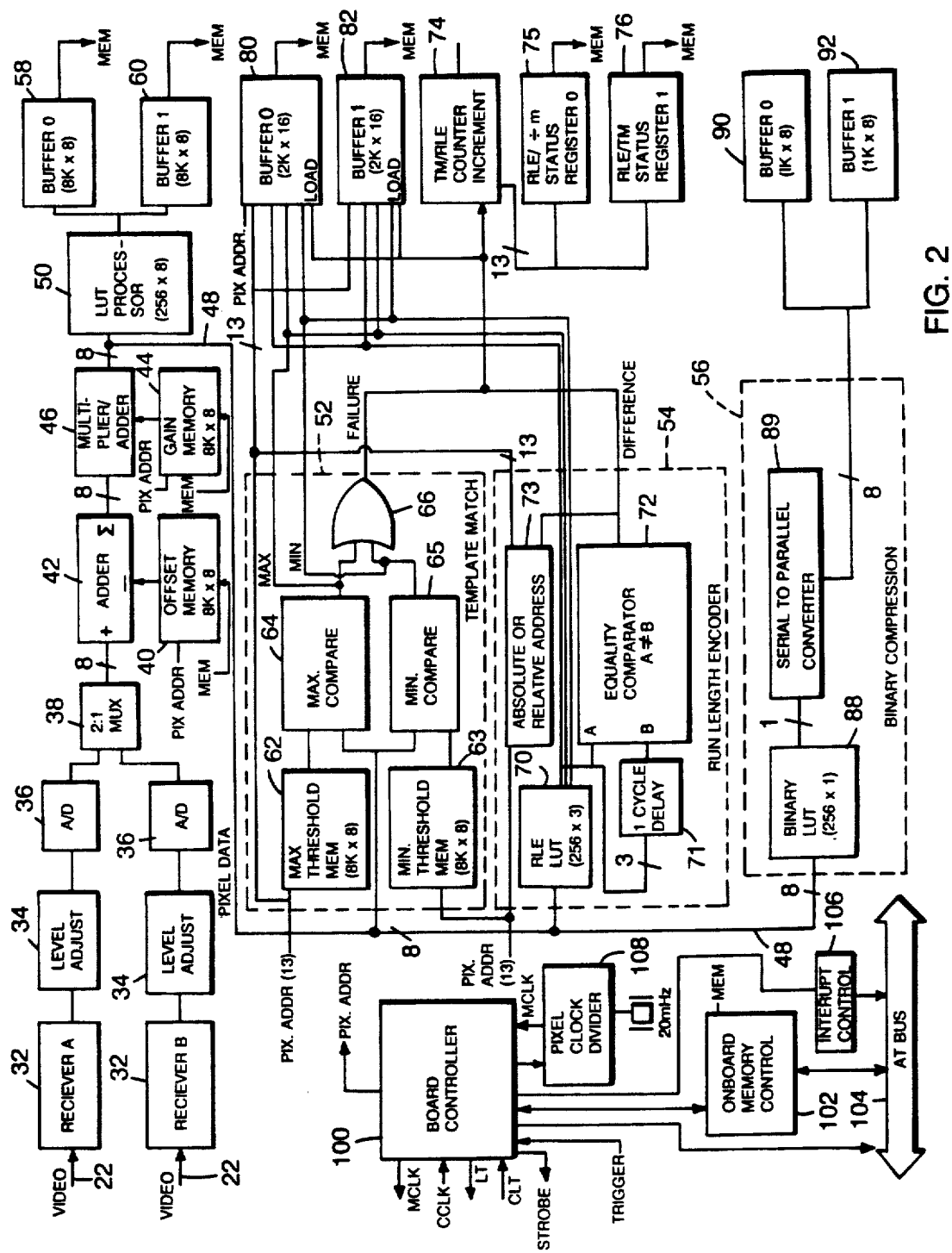
FIG. 2 is a block diagram of the FIG. 1 data acquisition circuit.

Referring to FIG. 2, data acquisition circuit 10 has two video inputs 22 that are each connected to respective receivers 32, level adjust circuits 34, and eight-bit analog-to-digital (A/D) converters 36. Each receiver 32 includes a capacitor used to remove the DC component of the incoming signal. Each level adjust circuit 34 includes an offset voltage register and a reference voltage register connected to control respective digital-toanalog converters, the output of one converter being added to the incoming voltage so that a minimum sensed value is near ground in the input to the respective A/D converter 36, the output of the other converter being used to provide a voltage reference signal to the respective A/D 36 so that the maximum output of the A/D corresponds to the maximum sensed voltage. The outputs of A/D converters 36 go to 2:1 multiplexer 38. The output of multiplexer 38 is provided to the a + input to adder 42. The eight-bit data output of offset memory 40 is connected a −(subtract) input to adder 42, which then provides as its eight-bit summation output the value of the plus input minus the offset read from offset memory 40. The summation output of adder 42 is an offset-corrected digital signal that is provided as one input to multiplier/adder 46. The other input to multiplier/adder 46 is the eight-bit gain correction value read from gain memory 44.

The eight-bit parallel output of multiplier/adder 46 is a calibrated digital intensity signal (referred to as pixel data on FIG. 2) that is provided to four subsystems over bus 48. These subsystems are look-up table (LUT) processor 50, template match circuit 52, run-length encoding circuit 54, and binary compression circuit 56.

LUT processor 50 is a 256×8 random access memory (RAM) that is addressed by eight-bit calibrated digital intensity signals on bus 48. The eight-bit output of the RAM is read to line store buffers 58, 60 (each being an 8K × 8 RAM).

Template match circuit 52 includes maximum threshold memory 62, minimum threshold memory 63, maximum comparator 64, minimum comparator 65 and failure gate 66. Maximum and minimum threshold memories 62, 63 are connected to be addressed by 13-bit pixel addresses and to provide eight-bit threshold values read from them to respective maximum and minimum comparators 64, 65, which also receive eight-bit calibrated digital intensity signals from bus 48. The too high and too low outputs of comparators 64, 65 are provided to failure gate 66 and to bits 14, 15 of buffers 80, 82 (each being a 2K × 16 RAM). The output of failure gate 66 is provided to the increment input of TM/RLE counter 74.

Run length encoding circuit 54 includes look-up table 70 (256×3 RAM), which is addressed by the eight-bit digital intensity signal on bus 48 and outputs three-bit thresholded values to one-cycle delay element 71 and equality comparator 72, which also receives the output of one-cycle delay element 71. The output of equality comparator 72 is also provided to the increment input o TM/RLE counter 74. The three-bit thresholded values are also provided to bits 13, 14, 15 of buffers 80, 82. Absolute-or-relative-address circuit 73 either feeds through the absolute address or subtracts the address of the prior pixel having a change in value from the current pixel having a change in value.

Binary compression circuit 56 includes binary LUT 88 (256×1 RAM), which provides its single-bit output to eight-bit shift register 89. The eight-bit output of shift register 89 is provided to one of buffers 90, 92 (each being a 1K×8 RAM).

OPERATION

Before using camera 12 and circuit 10 in data acquisition, offset and gain correction values must be determined for offset memory 40 and gain memory 44, and the user must provide desired conversion values for LUT processor 50, the minimum and maximum thresholds for each photocell for memories 62, 63 of template match circuit 52, the conversion values for reducing the eight-bit intensity signals to three-bits in LUT 70 of run-length encoding circuit 54, and the conversion values for reducing the eight-bit intensity signals to one-bit signals in LUT 88 of binary compression circuit 56. The offset voltage and reference voltage registers in level adjust circuits 34 must also be set with values. The memories that are addressed by pixel addresses (PIX ADDR), memories 40, 44, 62, 63, are 8K deep and thus can be used with line scan cameras having up to 8K photocells; the pixel addresses are provided by a counter in synchronism with CCLK and pipelined as necessary (by components not shown). The other memories are all addressed by eight-bit pixel data. All memories are written into by onboard memory control 102. The offset and gain values for memories 40, 44 and the offset voltage and reference voltage values stored in registers in level adjust circuit 34 are determined by using camera 12, while the other values are entered by the user depending upon the application.

To determine the offset values for offset memory 40, the lens cap is left on camera 12 (so that the measured intensity values should be zero), and a plurality (e.g., ten) lines of offset values are obtained. The digital output from A/D converter 36 is passed unaltered through adder 42, multiplier/adder 46, and LUT processor 50 into buffers 58, 60, one line being read into one buffer while the preceding line is read from the other buffer under control of onboard memory control 102 and provided to AT bus 104 of computer 14. The plural values for each photocell are averaged, and the average values are read into offset memory 40. Because the lens cap is left on camera 12, the measured values should be zero. During operation of camera 12, the average values stored in memory 40 are subtracted from the digital intensity signal from A/D converter 36 to correct for the offset.

Gain correction values are determined by removing the lens cap and exposing camera 12 to a white background (so that the highest measured values should be obtained). The digital output from A/D converter 36 is passed through adder 40 (where the offset values in memory 40 are now subtracted from intensity values for respective photocells) passed unaltered through multiplier/adder 46 and LUT processor 50 into buffers 58, 60, one line being read into one buffer while the preceding line is read from the other buffer under control of onboard memory control 102 and provided to AT bus 104 of computer 14. The plural values for each photocell are averaged, and gain correction values (GCVs) are calculated by computer 14 according to the following equation:

$$GCV = maxpixel/pixel - 1$$

Maxpixel is the value in the line having the greatest value when exposed to a uniform white background, and pixel is the average pixel value for the photocell. The gain correction values are read into gain memory 44. Because camera 12 is exposed to a white background, the measured values should be close to the upper end of the eight-bit range, namely 255. During operation of camera 12, the gain correction values stored in memory 40 are added to 1.0, and the result is multiplied times the offset-corrected signal from adder 42 at multiplier/adder 46. When the stored offset and gain correction values are employed, the calibrated intensity signals for all photocells should be zero when the lens cap is left on and 255 when exposed to the white background.

The value stored in the offset register in level adjust circuit 34 is determined by taking measurements with the lens cap on and adjusting the offset voltage added to the incoming signal until a small number of photocells have a reading of 00000001 from A/D converter 36. The value stored in the reference voltage register in level adjust circuit 34 is determined by taking measurements of a bright white background (maximum brightness under the same lighting conditions and exposure time to be used during operation) and adjusting the reference voltage until the reference voltage is at a small amount above or at the maximum voltage of the signal input to A/D converter 36. With these numbers in the offset and reference voltage registers in level adjust circuit 34, the full scales of A/D converters 36 are used when sensing light varying from no light to maximum brightness. i0 During operation, the frequency of MCLK is set by selecting the divisor employed by pixel clock divider 108, the frequency selected being based upon the application in which camera 12 is being employed. MCLK is provided by board controller 100 to camera control 20, and it in turn provides CCLK to board controller 100 to provide precise timing for sampling by A/D converters 36. MCLK and CCLK are provided as part of an RS 422 output, a factory inspection standard that also includes the option of an external trigger or automatic triggering. If 20 MHz is selected as the clock frequency, then channels A and B are used (camera 12 would also have two channels), and the outputs of A/D converters 36, at 10 MHz, are multiplexed at multiplexer 38 at 20 MHz. At 10 MHz or less, only one video channel is used.

Photocells 16 are simultaneously triggered to be exposed to an object being viewed based on a control signal on line 28 from camera control circuit 20. The values in the individual photocells are then, upon receiving an LT pulse, simultaneously transferred to corresponding storage elements of analog shift register 18, and the analog outputs are sequentially accessed so as to provide a video signal on line 22 to data acquisition circuit 10. A CLT pulse from camera control 20 is used to precisely indicate when a line of data is being transmitted, the falling edge of the CLT pulse being used as a reference when determining when to enable the A/D to begin reading valid data. The CCLK timing pulses on line 26 are used to identify the portions of the video signal corresponding to individual photocells. The strobe signal from board controller 100 can be used to time a high-intensity strobe light to illuminate the field being viewed at a specific time for a specific time period (e.g., at pixel 20 turn on for 100 MCLK pulses) coinciding with exposure of photocells 16; this permits a very precisely controlled amount of light to be provided at the desired time. The trigger signal to board controller 100 can be used to trigger when photocells 16 will be exposed, thus permitting exposure to be triggered and thus synchronized with the process being viewed.

The video signal from level adjust circuit 34 is converted to an eight-bit, parallel digital output at A/D converter 36, and the CCLK pulse is provided by board controller 100 to A/D converter 38 to time the sampling of the output to obtain values associated with individual photocells. As the digital intensity signals for the photocells in the linear array are sequentially provided to adder 42, the respective offset values are accessed, by addressing offset memory 40, and subtracted from the digital intensity signals. As the offset-corrected signals pass on to multiplier/adder 46, they are multiplied by 1.0 plus the respective gain correction values from memory 44. The calibrated data signal output from multiplier 46 on bus 48 is then processed by one or more of the further processing circuits 50, 52, 54, 56 prior to delivering the information to computer 14.

The data signal on bus 48 is used to address the RAM in LUT processor 50, and the output is alternately read into line store buffers 58, 60, one line being read into one buffer while the preceding line is available to be read from the other buffer under control of onboard memory control 102. Depending on the values stored in the RAM of LUT processor 50, processor 50 can be used to offset, perform arithmetic or logic operations on, threshold intensity values, or pass them unaltered.

If template match circuit 52 is being used, the calibrated data signal on bus 48 is compared with both a minimum threshold value read from minimum threshold memory 63 at minimum comparator 65 and the maximum value read from maximum threshold memory 62 at maximum comparator 64. The outputs of comparators 64, 65 are combined in a logical OR operation at gate 66, and its failure output is used to increment counter 74 and load a photocell address into a buffer 80 or 82. For each failure condition, the thirteen-bit address of the photocell and the type of failure (i.e., less than minimum threshold or greater than maximum threshold) are stored in one of two buffers 80, 82, the information for one line being written into one buffer while information for the preceding line is read from the other. Of the sixteen bits in the buffers, the photocell addresses are the first thirteen bits; one bit is used to indicate failure of a maximum threshold; one bit is used to indicate failure of a minimum threshold, and one bit is not used. The output of counter 74, indicating how many failure conditions were counted in a line of the line scan camera, is stored in status register 75 or 76.

If run length encoding circuit 54 is employed, the eight-bit calibrated data signal on bus 48 is used to address a three-bit value in LUT 70, and this is sent to equality comparator 72 and one-cycle delay 71. In comparator 72, the three-bit value for one photocell is compared with that for the preceding photocell; whenever there is a change in value, the thirteen bit photocell address and the three-bit value are sent to buffers 80, 82, one buffer being used for one line, while information for the preceding line is read from the other buffer. In addition, the first photocell address of each new line and its pixel value are also stored in buffers 80, 82. The stored address, provided by circuit 73, is either the absolute address or the difference in address from the previous photocell at which there was a change in value, depending on the mode selected by the user.

Because run length encoding circuit 54 and template matching circuit 52 share buffers 80, 82 and registers 75, 76, only one of these circuits can be used at one time.

Binary compression circuit 56 uses the eight-bit digital intensity signal on bus 48 to address binary LUT 88. The one-bit output of LUT 88 is received one bit at a time into shift register 89. After eight bits have been received, they are outputted in parallel and stored in one of two buffers 90, 92, using one buffer for one line and the other for the next line.

On board memory control circuit 102 can access data stored in one buffer of each of the three pairs of buffers 58, 60; 80, 82; or 90, 92 at one time and provide the data to computer bus 104. Interrupt control 106 is used in communication between board controller and computer 14.

Data acquisition circuit 10 thus analyses the raw data as they are received from the camera and provides information in the data in a useful and compressed format for use by computer 14. Instead of the raw pixel values, values manipulated by LUT processor 50 can be used. Alternatively, for example, where the application only requires that the object be within some minimum and maximum values, template match circuit 52 can be used to only provide an identification of when a failure has occurred. Similarly, if the application only requires determining where the ends of the object are, run length encoding circuit 54 provides this minimal information. Also, where the test results are of a go/no-go nature, one bit per pixel is sufficient, and the amount of data can be greatly reduced by using binary compression circuit 56.

OTHER EMBODIMENTS

Other embodiments of the invention are within the scope of the following claims.

What is claimed is:

1. A data acquisition circuit for receiving an analog input signal having a magnitude representing light intensity detected by a sequentially accessed, linear array of photocells of a line scan camera and providing digital data signals for use by a computer, said circuit comprising an input for receiving said analog input signal, an analog-to-digital converter to convert said analog input signal to a stream of digital intensity signals representing the intensities detected by sequentially accessed photocells of the array, a threshold memory storing threshold values for respective said photocells at respective pixel addresses, a comparator connected to receive said digital intensity signals from said converter and said threshold values from said threshold memory and to compare the digital intensity signal for a given photocell with the threshold value for the same photocell, address means for provide pixel addresses to address said threshold memory to address respective threshold values and provide them to said comparator as the digital intensity signal for a given photocell is presented to said comparator, and storage means to store the pixel address at which there is a failure of the digital intensity signal to meet a threshold, said storage means comprises two buffers and means to write pixel addresses of failures of one line of intensity valves into one of said buffers as pixel addresses of failures in a preceding line of values is read out of the other said buffer.

2. The circuit of claim 1 wherein said memory stores minimum and maximum threshold values, and said storage means stores information as to whether there was a failure to meet the minimum or maximum threshold.

3. The circuit of claim 2 further comprising a counter connected to be incremented each time there is a failure to meet a threshold, and wherein said storage means stores the number of failures in a line.

4. The circuit of claim 1 further comprising a level adjust circuit connected between said input and said analog-to-digital converter.

5. The circuit of claim 4 wherein said level adjust circuit includes an offset voltage register and a digital-to-analog converter that is controlled by a digital output of said offset voltage register and outputs a voltage that is added to the analog input signal before it is received by said analog-to-digital converter.

6. The circuit of claim 4 wherein said level adjust circuit includes a reference voltage register and a second digital-to-analog converter that is controlled by an digital output of said reference voltage register and outputs a reference voltage signal provided to said analog-to-digital converter.

* * * * *